United States Patent Office.

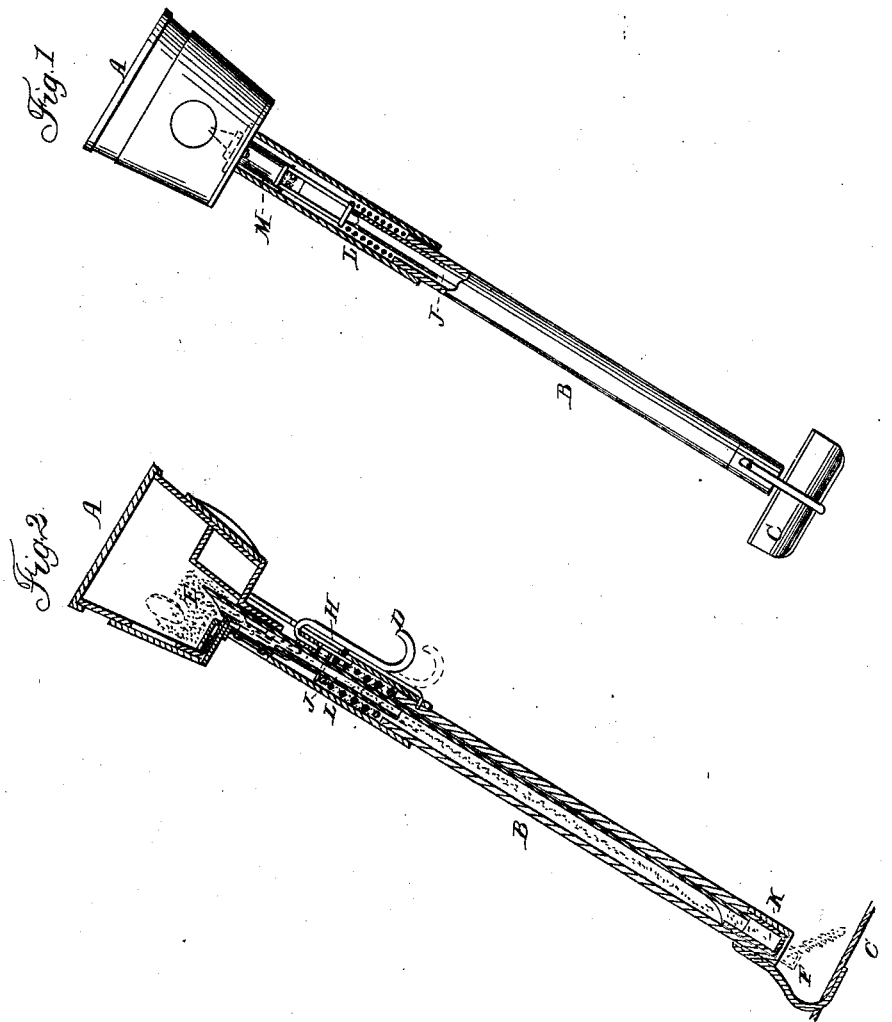

HENRY SOGGS, OF COLUMBUS, PENNSYLVANIA.

Letters Patent No. 62,376, dated February 26, 1867.

IMPROVEMENT IN COMBINED CORN PLANTER AND HOE.

*The Schedule referred to in these Letters Patent and making part of the same.*

TO ALL WHOM IT MAY CONCERN:

Be it known that I, HENRY SOGGS, of Columbus, Warren county, State of Pennsylvania, have invented an improved Corn Planter and Hoe combined; and I do hereby declare the following to be an exact description thereof, reference being had to the accompanying drawings, and to the letters of reference marked thereon, making a part of this specification, in which—

Figure 1 represents the machine.

Figure 2, a sectional view.

The nature of my invention consists in the arrangement of the hopper at the top of the handle and the hoe at the opposite end, the whole length of the handle being hollow, and containing the seeding devices.

A represents the hopper, B the hollow handle, and C the hoe; D the lever, curved so that the hand can operate the lever downwards as the hoe is struck into the ground. The grain falls through a valve, E, and passes through the handle B, and is discharged at F. The lever D fits into a small socket, H, that is attached to a long lever, J, extending from the hopper A to the lower end of the handle, where a small curved plate, K, catches the grain, holds it until the lever J is pressed down, and then drops the grain into the ground as the hole is made by the hoe C. A spiral spring, L, inside of the hollow handle, is attached to the lever J and regulates its operation. A slider and flat spring, M, at the bottom of the hopper, raises and lowers the valve E, to discharge the corn from the hopper by each motion of the lever J.

What I claim as my invention, and desire to secure by Letters Patent, is—

The arrangement of the seeding devices E J K and M, in the hollow handle of the hoe, with the hopper and seeder at the end of the handle, when arranged and combined as herein described and for the purposes set forth.

HENRY SOGGS.

Witnesses:
J. FRANKLIN REIGART,
JOB BARNETT.